(12) United States Patent
Cooper et al.

(10) Patent No.: US 7,014,215 B2
(45) Date of Patent: Mar. 21, 2006

(54) QUICK CONNECT COUPLING

(75) Inventors: Adrian R. Cooper, Huntingdon (GB); Geoffrey R. Keast, Molesworth (GB); Randall M. Leasure, Roscoe, IL (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/094,171

(22) Filed: Mar. 8, 2002

(65) Prior Publication Data

US 2002/0140221 A1 Oct. 3, 2002

Related U.S. Application Data

(60) Provisional application No. 60/274,670, filed on Mar. 9, 2001.

(51) Int. Cl.
*F16L 33/00* (2006.01)
(52) U.S. Cl. ............ 285/247; 285/321; 285/347; 285/256; 285/386
(58) Field of Classification Search ........... 285/245, 285/247, 248, 321, 347, 256, 386
See application file for complete search history.

(56) References Cited

U.S. PATENT DOCUMENTS

| | | | | |
|---|---|---|---|---|
| 738,503 | A * | 9/1903 | Waters ............... | 285/321 |
| 3,540,760 | A | 11/1970 | Miller et al. ......... | 285/321 |
| 3,773,360 | A * | 11/1973 | Timbers ............. | 285/321 |
| 3,948,548 | A * | 4/1976 | Voss ................. | 285/321 |
| 4,063,760 | A | 12/1977 | Moreiras ............ | 285/242 |
| 4,133,564 | A | 1/1979 | Sarson et al. ....... | 285/321 |
| 4,135,745 | A | 1/1979 | Dehar ............... | 285/319 |
| 4,191,408 | A | 3/1980 | Acker ............... | 285/113 |
| 4,193,616 | A | 3/1980 | Sarson et al. ....... | 285/39 |
| 4,278,276 | A * | 7/1981 | Ekman .............. | 285/321 |
| 4,448,447 | A * | 5/1984 | Funk et al. ......... | 285/321 |
| 4,471,978 | A * | 9/1984 | Kramer ............. | 285/321 |
| 4,570,980 | A * | 2/1986 | Goward ............ | 285/321 |
| 4,640,534 | A * | 2/1987 | Hoskins et al. ..... | 285/321 |
| 4,645,245 | A | 2/1987 | Cunningham ....... | 285/321 |
| 4,653,781 | A | 3/1987 | Sheets et al. ....... | 285/319 |
| 4,743,051 | A | 5/1988 | Proni ............... | 285/319 |
| 4,750,765 | A | 6/1988 | Cassidy et al. ..... | 285/321 |

(Continued)

FOREIGN PATENT DOCUMENTS

EP 0545469 * 6/1993 ............ 285/321

(Continued)

*Primary Examiner*—David Bochna
(74) *Attorney, Agent, or Firm*—C. H. Castleman, Esq.; J. A. Thurnau, Esq.; P. N. Dunlap

(57) ABSTRACT

A quick connect hose coupling for connecting a hose to a fixture of the type having a hose stem portion including a hose insert portion, having a fixture portion including a fixture connection portion, and having a joinder portion is disclosed. The joinder portion includes a male connection portion and a female connection portion. Each of male connection and female connection portions are adapted to join in a sealing and locking manner upon being pushed together. The coupling further includes threads and wrench mating flats adapted to disconnect the hose from the fixture. It is improved by the male connection portion being a unitary structure having a leading support cylindrical surface, a following support cylindrical surface, and a transition surface intermediate therein between. The leading support cylindrical surface has a leading radius. The following support cylindrical surface has a following radius. The following radius is larger than the leading radius.

14 Claims, 4 Drawing Sheets

U.S. PATENT DOCUMENTS

| | | | |
|---|---|---|---|
| 4,836,582 A | 6/1989 | Krause | 285/158 |
| 4,842,309 A | 6/1989 | La Vene et al. | 285/319 |
| 4,889,368 A | 12/1989 | Laipply | 285/18 |
| 4,936,544 A | 6/1990 | Bartholomew | 251/149.6 |
| 5,022,687 A * | 6/1991 | Ariga | 285/321 |
| 6,095,570 A * | 8/2000 | Hagen et al. | 285/321 |
| 6,554,320 B1 * | 4/2003 | Cresswell | 285/256 |

FOREIGN PATENT DOCUMENTS

| | | |
|---|---|---|
| WO | 99/11965 | 3/1999 |

* cited by examiner

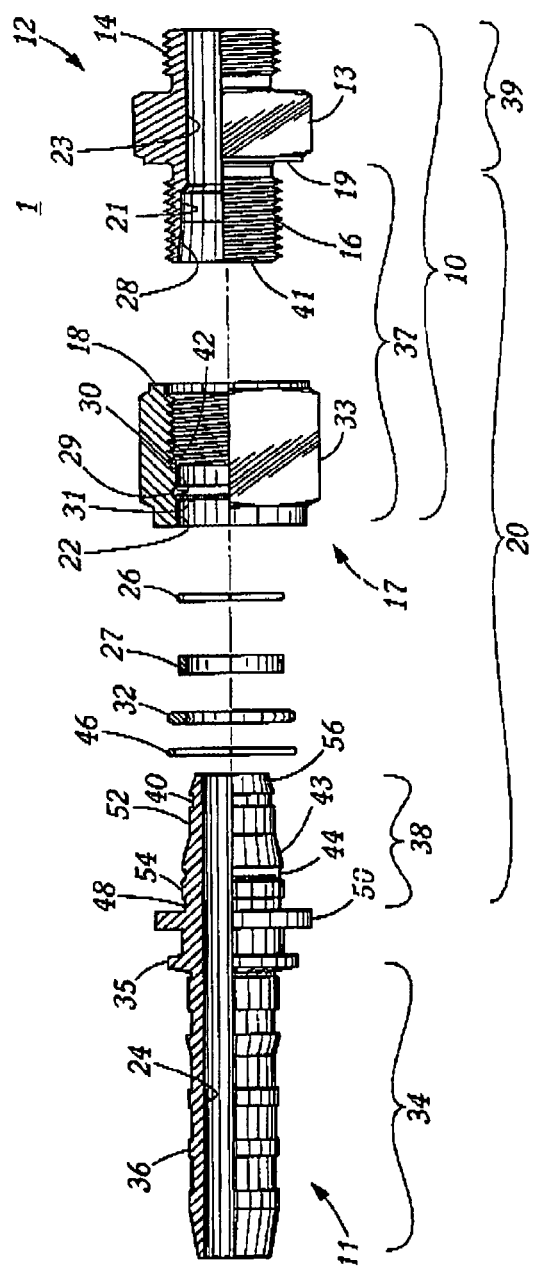
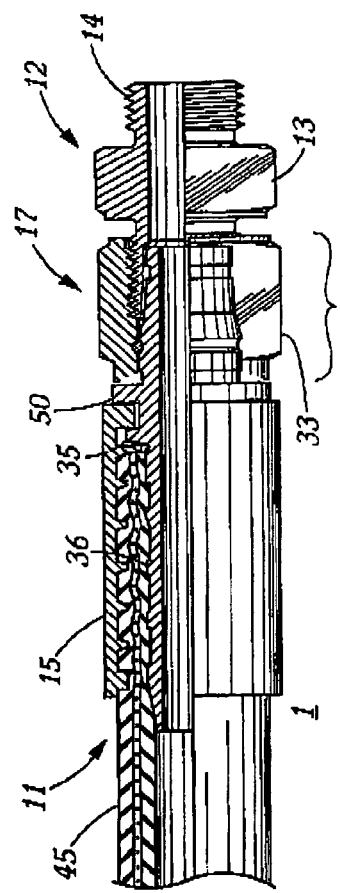
Figure 1
Figure 2

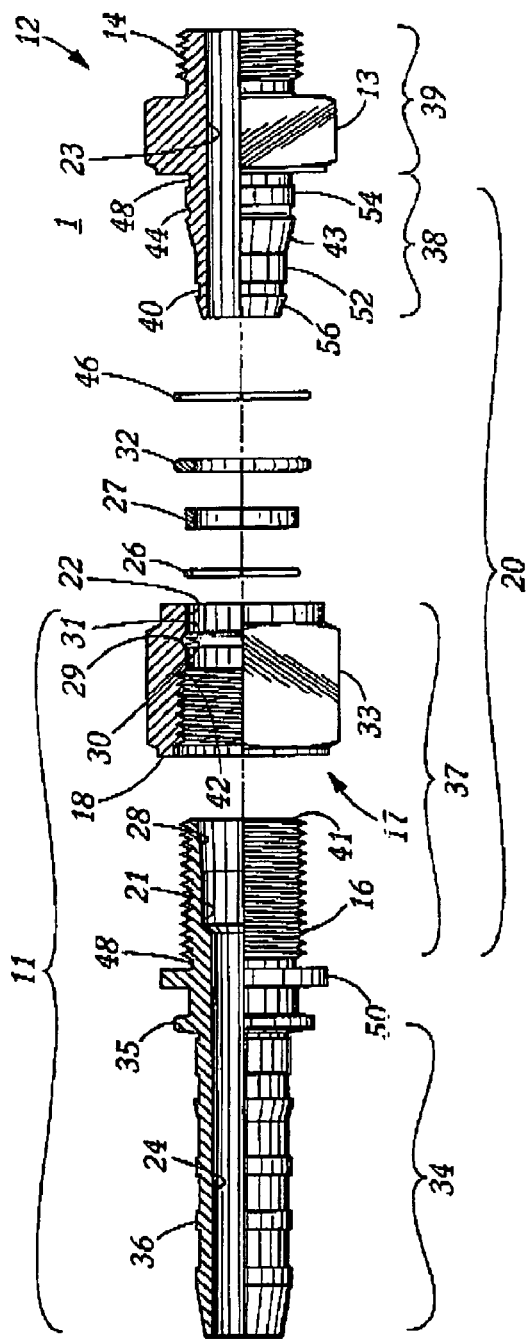
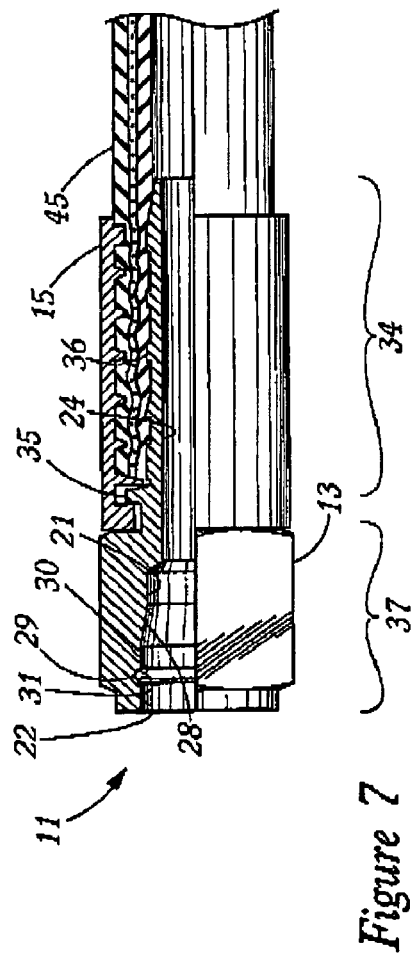
Figure 6
Figure 7

QUICK CONNECT COUPLING

CROSS-REFERENCE TO RELATED APPLICATIONS

This application claims priority to U.S. Provisional Patent Application Ser. No. 60/274,670, filed Mar. 9, 2001 and entitled QUICK CONNECT COUPLING. The subject matter of this application is incorporated herein by this reference.

BACKGROUND OF THE INVENTION

1. Field of the Invention

This invention relates generally to flexible hose couplings. More particularly, it relates to a novel and improved quick connect hose coupling. Specifically, it relates to an improved high-pressure push-to-connect and threaded disconnect flexible hose coupling.

2. Description of the Prior Art

Quick connect couplings are known. In such couplings a body assembly or fixture portion may be pre-assembled on associated fixtures, machinery or equipment. The hose connection portion, including a hose stem portion and a ferrule, are attached to an open end of the hose to be connected to the fixture, machinery or equipment. The hose stem portion has a hose insert portion, which is inserted into the open end of the hose. The ferrule is then compressed about the hose end containing the insert causing all portions to be permanently affixed. Merely pressing the hose connection portion into the body assembly or fixture portion subsequently completes the hose connection. Such quick connect couplings are particularly desirable when the hose must be connected in a location which is not readily accessible since it eliminates the need for starting the threads and the danger of cross threading. Further, since the body assembly or fixture portion may be threaded into place as a pre-assembly operation, it is easy to insure that the body assembly or fixture portion receives proper torque. Further, the time of assembly and in turn the assembly costs are reduced.

The disconnection of quick connect couplings includes the body assembly or fixture portion having a threaded portion that allows the unscrewing of the body assembly or fixture portion from the machine or fixture to which the hose is attached. The mentioned threaded portion being between separable portions of the body assembly. Upon unthreading the threaded portion, one part of the body assembly remains with the machine or fixture. The other part separates from the first part and remains with the hose connection portion. In either instance, while connection is a quick single stroke process, the disconnection requires a slower unthreading process to provide the opportunity to discover that the fitting is under internal pressure before being completely disconnected. Reconnection is effected, from this point forward, by the inverse of the disconnection process.

Quick connect couplings provide means to seal between the hose stem portion and the body assembly or fixture portion and to provide a mechanical locking of the hose stem portion in the body assembly or fixture portion. To achieve maximum benefit from a quick connect coupling, such coupling must allow substantial tolerance in axial and lateral misalignment of the hose stem portion in relation to the body assembly portion when the process of connection is first begun. Such tolerance facilitates effective connection even when minimum time or minimum access is available during the connection process. Still, the hose stem portion must seat securely upon completion of connection, and should result in a stable and durable connection. If stability is inadequate, movement between the hose stem portion and the body assembly portion leads to excessive wear of the interior of the coupling and premature failure, particularly of the sealing elements. Heretofore, quick connect couplings have merely represented a trade-off between being forgiving of such misalignment and being stable and durable. Couplings with high levels of stability tend to be less forgiving of such misalignment. Forgiving couplings tend to lack stability.

Accordingly, there is a continuing need for a hose coupling that achieves both characteristics of being forgiving of axial and lateral misalignment, at the beginning of connection, and highly stable to enhance durability.

SUMMARY OF THE INVENTION

The present invention has as an object the provision of a quick connect hose coupling with an improvement in the combination of characteristics including forgiveness in axial and lateral misalignment of the hose stem portion and the body assembly portion during connection and a high degree of stability.

The present invention is an improved quick connect hose coupling for connecting a hose to a fixture of the type having a hose stem portion including a hose insert portion, having a fixture portion including a fixture connection portion, and having a joinder portion. The joinder portion includes a male connection portion and a female connection portion. Each of the male connection portion and the female connection portion are adapted to join in a sealing and locking manner upon being pushed together. The coupling further includes threads and wrench mating flats adapted to disconnect the hose from the fixture. It is improved by the male connection portion being a unitary structure having a leading support cylindrical surface, a following support cylindrical surface, and a transition surface intermediate therein between. The leading support cylindrical surface has a leading radius. The following support cylindrical surface has a following radius. The following radius is larger than the leading radius.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings:

FIG. 1 is an exploded elevation with one quarter cut-away of a preferred embodiment;

FIG. 2 is an elevation, with one quarter cut-away, of a preferred embodiment;

FIG. 6 is an exploded elevation, with one quarter cut-away, of a preferred embodiment; and, FIG. 7 is an elevation, with one quarter cut away, of a preferred embodiment of a hose stem including a female connection portion;

DETAILED DESCRIPTION OF THE PREFERRED EMBODIMENTS

Figure 3:
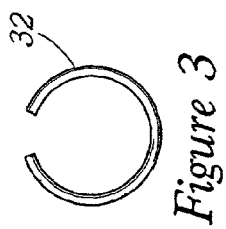
FIG. 3 is an elevation, of a snap ring, of a preferred embodiment.

Referring to FIGS. 1 through 3, one preferred embodiment of this quick connect coupling 1 invention includes body assembly or fixture portion 10 and hose stem 11. They are illustrated in FIG. 1 prior to the insertion of hose stem 11 into body assembly 10. The body assembly 10 includes adapter 12 having fixture connection portion 39 formed with central wrenching section 13 and fixture end 14 which has external threads for mounting body assembly 10 onto associated fixtures, machinery or equipment. It should be understood that although adapter 12 is illustrated as having external threads at fixture end 14, other types of end connections can be utilized. These include internal threads at fixture end 14, or adapter 12 being formed integral to the associated fixture or equipment.

Figure 5:
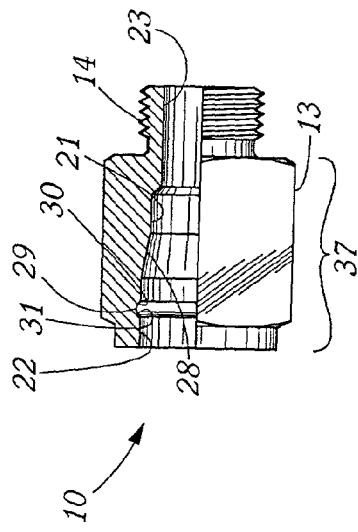
FIG. 5 is an elevation, with one quarter cut-away, of a preferred embodiment of a body assembly.

Joinder end 16 of adapter 12 is also externally threaded to receive nut 17. It is contemplated that adapter 12 can include joinder end 16 having internal threads for mating with alternate preferred embodiment of body assembly 10 of the form depicted in FIG. 5. This alternated preferred embodiment of body assembly 10, depicted in FIG. 5, is discussed below.

Normally, nut 17 is threaded onto adapter 12 with proper torque prior to installation of body assembly 10 on an associated fixture, machine or equipment. Female abutment 41 of adapter 12 abuts male abutment 42 of nut 17 when nut 17 is properly positioned with respect to adapter 12 and applied with proper torque. While, nut 17 is provided with forward end face 18. Face 18 remains spaced from wall 19 on adapter 12, for the embodiments depicted in FIGS. 1, 2, 4, and 6. However, the abutting relationship can be arranged to be between face 18 and wall 19, upon application of proper torque.

Adapter 12, in cooperation with nut 17, provides a female connection portion 37 including a tip-of male (TOM) receiving portion 21 and a base-of-male (BOM) receiving portion 22. Beyond TOM receiving portion 21 is adapter bore 23 which preferably has a diameter at least substantially equal to the inside diameter of hose stem bore 24.

The rearward end of TOM receiving portion 21 is has a transition matching surface, in this instance conical flaring section 28.

Nut 17 has an interior annular groove 29 forward spaced from BOM receiving portion 22. Groove 29 is preferably formed with a substantially radial forward face 30 and an inclined rearward face 31, which function as discussed below. Positioned within groove 29 of nut 17 is expandable lock ring or snap ring 32 shaped as illustrated in FIG. 3. Nut 17 has wrenching flats 33 so that nut 17 may be threaded onto and off of adapter 12. Joinder end 16, nut 17, and snap ring 32 comprise female connection portion 37 for this preferred embodiment.

Still referring to FIG. 1, hose stem 11 includes male connection portion 38 and debris barrier wall 50. Male connection portion includes, rearward peripheral depression 48 in which resides second O-ring seal 46, following support cylindrical surface 54, intermediate peripheral depression 44 for receiving lock ring 32 upon final assembly of coupling 1, transition surface or camming ramp 43, leading support cylindrical surface 52, forward peripheral depression 40 in which resides O-ring spacer 27 and first O-ring seal 26, ad annular lead-in surface 56. Female connection portion 37 and male connection portion 38, in combination with first O-ring seal 26, O-ring spacer 27, snap ring 32, and second O-ring seal 46 are joinder portion 20, for this embodiment and for the embodiment of FIG. 6.

Figure 8:
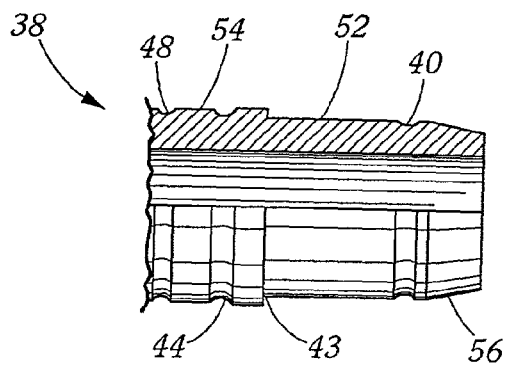
FIG. 8 is an elevation, with one quarter cut away, of a preferred embodiment of a male connection portion.
Figure 9:
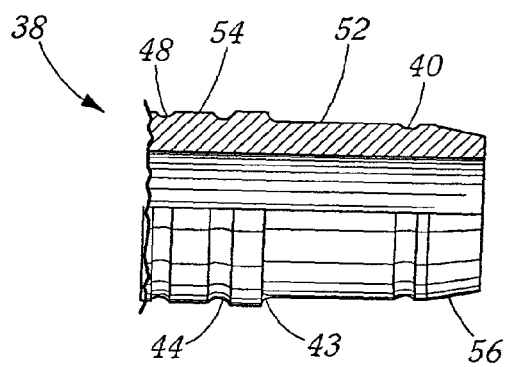
FIG. 9 is an elevation, with one quarter cut away, of a preferred embodiment of a male connection portion.
Figure 10:
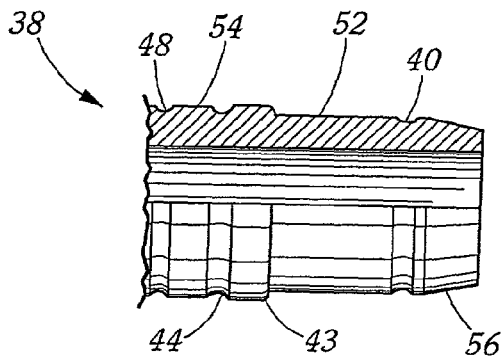
FIG. 10 is an elevation, with one quarter cut away, of a preferred embodiment of a male connection portion.

While the transition surface of this preferred embodiment is a frustoconical camming ramp 43, it is contemplated that the transition surface can also be a step, a concave partial spheroid, a convex partial spheroid, as detailed in FIGS. 8 through 10, or a combination thereof. In such case, transition matching surface 28 can either remain frustoconical, as depicted, or can be conformed to the shape of the transition surface. Such a step form of transition surface 43 and matching surface 28 is less supportive of the allowable misalignment function of coupling 1, but can enhance the stability function.

Following support cylindrical surface 54 can be limited to spanning only the distance between rearward peripheral depression 48 and intermediate peripheral depression 44, as depicted, can continue forward beyond intermediate peripheral depression 44 until meeting camming ramp 43, or beyond rearward peripheral depression 48 until meeting debris barrier wall 50, or both. In which cases, intermediate peripheral depression 44 or rearward peripheral depression 48, or both, bisects following support cylindrical surface 54. Leading support cylindrical surface 52 can likewise be limited to spanning the distance between camming ramp 43 and forward peripheral depression 40, as depicted, or can continue forward to meet annular lead-in surface 56. In which case, forward peripheral depression 40 bisects leading annular support surface 52. Annular lead-in surface 56 can be frustoconical, as depicted or substantially cylindrical with an outer radius smaller than the outer radius of leading support cylindrical surface 52. Outer radius of leading support cylindrical surface 52 is smaller than outer radius of following support cylindrical surface 54. The progressively larger radii of the various surfaces, including those that may be frustoconical, provide the guiding function that allows substantial misalignment of hose stem 11 in relation to body assembly 10 in the initial phase of joinder.

O-ring spacer 27 is provided to increase the pressure to which coupling 1 can be subjected before fluid begins to by-pass O-ring 26 and coupling 1 begins to leak. Construction of O-ring spacer 27 varies depending upon the fluid pressure of the associated application of coupling 1 and is well know in the art. Hose stem 11 also includes hose insert portion 34 which extends inwardly from hose stop 35 and is adapted to fit snugly with the connection end of a hose (not depicted). Hose insert portion 34 includes barbs 36 to facilitate increased resistance to separation of hose stem 11 from the associated hose. Commonly, a ferrule (not depicted) is crimped about the end of the hose in which hose insert portion 34 extends and about hose stop 35 to increase the resistance to separation of hose stem 11 from the hose.

The assembled position is illustrated in FIG. 2. Initially all items of body assembly 10 are assembled including nut 17 threaded upon adapter 12 with proper torque and lock ring 32 is placed within interior annular groove 29. Hose stem 11 is pressed into body assembly 10. Male connection portion 38 of hose stem 11 extends through BOM receiving portion 22 and into TOM receiving portion 21 of adapter 12 with a close fit. The various proportions are arranged so that O-ring seal 26 has an unstressed outside diameter less than the inside diameter of TOM receiving portion 21 so that the movement of male connection portion 38 to the assembled position of FIG. 2 causes radial compression of O-ring seal 26. In such condition O-ring seal 26 provides a fluid tight joint between the male connection portion 38 and adapter 12.

During such assembly the camming ramp 43 engages lock ring 32 and radially expands lock ring 32 from its unstressed condition out into the interior groove 29. During such movement lock ring 32 is urged forward by camming ramp 43 and engages forward radial face 30. Because face 30 is radial, lock ring 32 can expand easily as camming ramp 43 is moved into the assembled position.

As male connection portion 38 is moved into the fully assembled position intermediate peripheral depression 44 moves to a position within lock ring 32 so that lock ring 32 is allowed to snap back into a position in which it bridges between the grooves 29 and intermediate peripheral depression 44. In such bridging position, hose stem 11 is permanently mechanically locked in position within nut 17.

Lock ring 32 is formed with an unstressed radius sized so that its outer periphery has a radius greater than the radius of the inner extremities of faces 30 and 31 of groove 29 and its inner periphery has a radius less than the radius of the male connection portion 38 on the two opposite sides of the intermediate peripheral depression 44. Consequently, lock ring 32 is trapped within groove 29 of nut 17 prior to assembly, but snaps into intermediate peripheral depression 44 upon assembly of hose stem 11 within the body assembly 10.

The rearward face 31 insures that lock ring 32 is cammed inwardly into intermediate peripheral depression 44 when hose stem 11 is subjected to forces tending to pull hose stem 11 out of body assembly 10. Such axial force on hose stem 11 occurs from pressure within the coupling but merely causes lock ring 32 to be cammed inward along rearward face 31 to a position in which the interior of lock ring 32 bottoms out on the inner faces of intermediate peripheral depression 44. To insure this locking action, the maximum radius of camming ramp 43 is selected to be less than the radius of BOM receiving portion 22 by an amount less than the diameter of the wire forming lock ring 32. With such structure, a positive mechanical locking of male connection portion 38 within nut 17 is provided.

Preferably lock ring 32 is formed with a uniform radius throughout the major portion of its length, as illustrated in FIG. 3. In order to allow lock ring 32 to expand as male connection portion 38 is pressed into the assembled position, the depth of the interior groove 29 is proportioned to be at least as great as the diameter of the wire forming lock ring 32.

In the embodiment of FIGS. 1 and 2, body assembly 10 is installed on the associated fixture, machinery or equipment with nut 17 and lock ring 32 each properly in position. Completion of the assembly is accomplished thereafter by merely pressing hose stem 11 into body assembly 10 to its assembled position in which it is permanently locked within nut 17 by operation of lock ring 32.

Hose stem 11 is preferably provided with debris barrier wall 50 which is aligned with the end of nut 17 when hose stem 11 is in the assembled position. Such structure provides a visual indication that the hose end has been pushed into the body assembly a sufficient amount to cause O-ring seal 26 to engage the end of male connection portion 38 and for lock ring 32 to be adequately engaged. Further, debris barrier wall 50 blocks certain debris from entering body assembly 10. The reduction of the entrance of debris is greatly enhanced by the presence of second O-ring seal 46 at rearward peripheral depression 48. Second O-ring seal 46 seals the gap that would otherwise exist at the interface between male connection portion 38 and BOM receiving portion 22 upon joinder of hose stem 11 with body assembly 10.

With this embodiment it is possible to remove hose stem 11 from adapter 12 by threading nut 17 off of adapter 12 and to reinstall hose stem 11 by threading nut 17 back onto adapter 12. Thus, the embodiment of FIGS. 1 and 3 can be assembled and disassembled without removal of adapter 12 from the associated fixture, machinery or equipment. However, during the first assembly, hose stem 11 is installed by merely pressing it into adapter 12.

The conical flaring section 28 performs a dual function. It provides clearance for male connection portion 38. Also, the cooperation of conical flaring section 28 with camming ramp 43 assists in allowing for substantial axial and lateral misalignment at the initial insertion of hose stem 11 into body assembly 10 by guiding male connection portion 38 into TOM receiving portion 21 of body assembly 10. Once male connection portion 38 is fully seated within body assembly 10, a close fit occurs between leading support cylindrical surface 52 and TOM receiving portion 21 and between following support cylindrical surface 54 and BOM receiving portion 22. Accordingly, leading support cylindrical surface 52 cooperates with TOM receiving portion 21 and following support cylindrical surface 54 cooperates with BOM receiving portion 22 to provide a high degree of angular stability of hose stem 11 in relation to body assembly 10. The high degree of stability reduces the movement at the interface of hose stem 11 and body assembly 10 when torque loads are applied upon hose coupling 1. This reduces wear upon all parts that come into contact with each other and most particularly first and second O-ring seals 26 and 46. O-ring seals tend to be items of relatively short life within hose couplings giving rise to unacceptable leakage.

Figure 4:
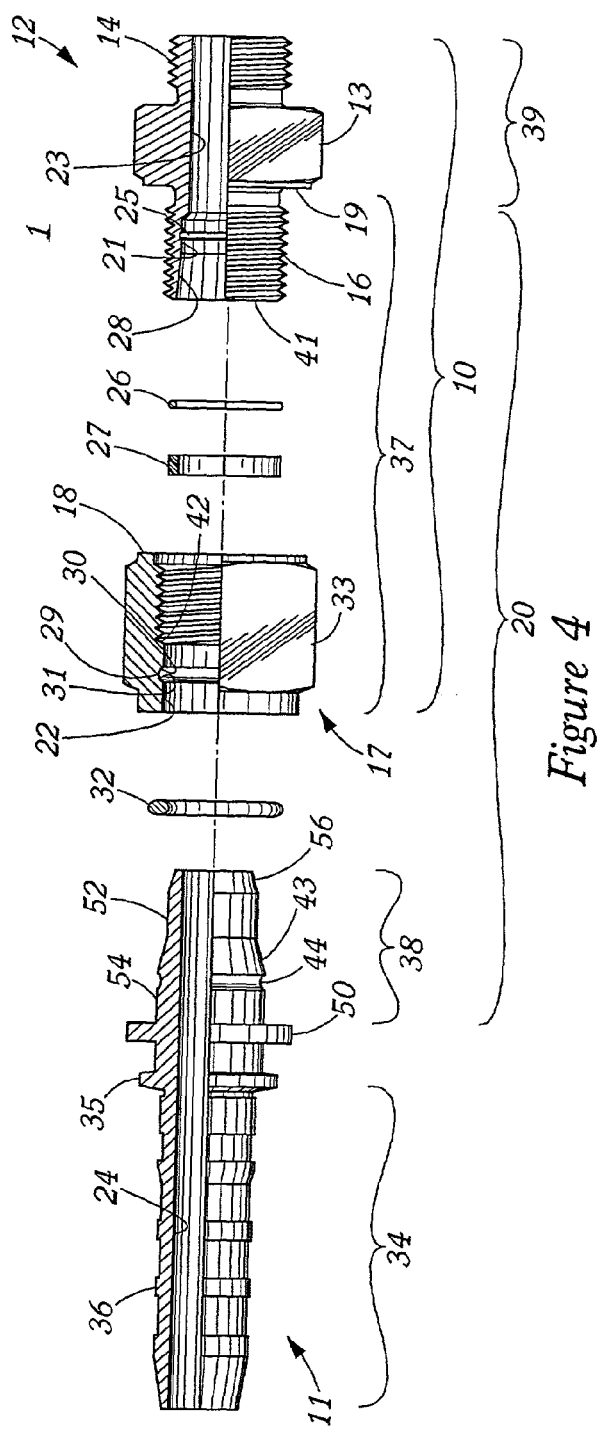
FIG. 4 is an exploded elevation, with one quarter cut-away, of a preferred embodiment.

FIG. 4 illustrates a second preferred embodiment of this invention in which adapter 12 is provided with an inner annular seal groove 25 intermediate the ends of TOM receiving portion 21 and transition matching surface 28. O-ring 26 and O-ring spacer 27 are positioned therein, respectively rearward. Thus, forward peripheral depression 40 is absent from male connection portion 38. This preferred embodiment also lacks rearward peripheral depression 48 and associated second O-ring seal 46. It follows that joinder end 16, nut 17, snap ring 32, O-ring seal 26 and O-ring spacer 27 form part of female connection portion 37. In all other significant respects, this preferred embodiment assembles and disassembles the same as the previously described preferred embodiment.

FIG. 5 illustrates another preferred embodiment of body assembly 10. In this preferred embodiment, body assembly 10 has threads at fixture end 14 like the previous embodiment. There is no nut 17. However, lock ring 32 is still inserted into interior annular groove 29. Final assembly is the same using this embodiment of body assembly 10 as for the previous embodiment. However, disconnection does not involve separation of nut 17 and hose stem 11 from adapter 12. Rather, the entire body assembly 10 is unthreaded from the associated fixture or machine. The salient features of all embodiments of body assembly 10 giving rise to improved stability without sacrificing forgivingness during final assembly are present for all preferred embodiments depicted. Reversal of location of first O-ring seal 26 and O-ring spacer, between hose stem 11 and body assembly 10, as occurred in the embodiment depicted in FIG. 4, is also contemplated.

It should be noted that there is freedom for relative rotation between the hose end assemblies and the body assemblies of all embodiments. Such relative rotation permits nut 17, or body assembly 10 as the case may be, to be rotated for disassembly of quick coupling 1 without corresponding rotation of the associated hose. Similarly, the hose may be rotated relative to body assembly 10 when required for installation in confined locations.

FIG. 6 depictes a preferred embodiment where female connection portion 37 and male connection portion 38 of joinder portion 20 are reversed as among hose stem 11 and adapter 12, in contrast to the preferred embodiment of FIG. 1. In this embodiment, nut 17 will be normally properly torqued upon hose stem 11 prior to final assembly connecting the hose to the fixture. Male connection portion 38 includes forward peripheral depression 40, transition surface 43, intermediate peripheral depression 44 rearward peripheral depression 48 leading support cylindrical surface 52, following support surface 54, and annular lead-in surface 56. In the depressions reside first O-ring seal 26, O-ring spacer 27, and second O-ring seal 46, respectively. In all other significant respects this preferred embodiment assembles and disassembles the same as the preferred embodiment depicted in FIG. 1. It is also contemplated that joinder end 16 can include annular seal groove 25 in exchange for the loss of intermediate peripheral depression 44 from male connection portion 38.

FIG. 7 depicts hose stem 11 having female connection portion 37 instead of male connection portion 38. This configuration is appropriate to use in connection with adapter 12 of the embodiment of FIG. 6. Female connection portion 37 can also include annular seal groove 25.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

We claim:

1. An improved hose coupling stem of the type including a hose insert portion and a male connection portion, the improvement comprising:
    said male connection portion having a leading support cylindrical surface, a following support cylindrical surface, a transition surface intermediate therein between, a forward peripheral depression opposite of said transition surface in relation to said leading support cylindrical surface, and intermediate to an annular lead-in surface,
    said leading support cylindrical surface having a leading radius and said following support cylindrical surface having a following radius,
    said following radius being larger than said leading radius, and said male connection portion further includes a first peripheral depression proximate said transition surface and adapted to receive a lock ring and a third peripheral depression adapted to receive a seal and said third peripheral depression is intermediate said following support cylindrical surface and said debris barrier wall.

2. An improved hose coupling of the type including a fixture connection portion, a female connection portion, and a male connection portion, the improvement comprising:
    said male connection portion having a leading support cylindrical surface, a following support cylindrical surface, and a transition surface intermediate therein between,
    said leading support cylindrical surface having a leading radius and said following support cylindrical surface having a following radius,
    said following radius being larger than said leading radius,
    said female connection portion including a nut having an interior groove having a forward radial face and a rearward camming face, with a lock ring in the form of an incomplete annulus having a substantially circular cross-section captured by said interior groove, and having a base-of-male receiving portion, wrenching flats, a male abutment, a forward end face, and internal threads, and including a joinder end of an adapter having a female abutment, a conical flaring section, tip-of-male receiving portion, a wall corresponding to said forward end face of said nut, and
    said fixture connection portion including a central wrenching section, a fixture end having external threads, and an adapter bore.

3. The improvement of claim 2, wherein said transition surface is frustoconical.

4. The improvement of claim 2, wherein said transition surface is contiguous with said leading support cylindrical surface.

5. The improvement of claim 2, wherein said transition surface is contiguous with said following support cylindrical surface.

6. The improvement of claim 2, wherein said male connection portion further includes a first peripheral depression adapted to receive an axial movement limiting lock.

7. The improvement of claim 6, wherein said first peripheral depression is proximate said following support cylindrical surface.

8. The improvement of claim 6, wherein said first peripheral depression is proximate said transition surface.

9. The improvement of claim 2, wherein said male connection portion further includes a second peripheral depression adapted to receive a seal.

10. The improvement of claim 9, wherein said second peripheral depression is proximate said leading support cylindrical surface.

11. The improvement of claim 2, wherein said male connection portion further includes a third peripheral depression adapted to receive a seal.

12. The improvement of claim 2, wherein said male connection portion further includes an annular lead-in surface.

13. The improvement of claim 12, wherein said annular lead-in surface is substantially frustoconical.

14. A quick connect hose assembly comprising:
    a hose,
    a hose stem portion including a hose insert portion,
    a ferrule,
    a fixture portion including a fixture connection portion,
    a joinder portion,
    said joinder portion including a male connection portion and a female connection portion, including a nut,
    each of said male connection portion and said female connection portion adapted to join in a sealing and locking manner upon being pushed together, said coupling further including threads and wrench mating flats adapted to disconnect said hose from said fixture, said male connection portion being a unitary structure having a leading support cylindrical surface, a following support cylindrical surface, and a transition surface intermediate therein between, said leading support cylindrical surface having a leading radius, said following support cylindrical surface having a following radius, said following radius being larger than said leading radius, and said female connection portion including an interior groove having a forward radial face and a rearward camming face and including a lock ring in the form of an incomplete annulus having a substantially circular cross-section captured by said interior groove.

* * * * *

UNITED STATES PATENT AND TRADEMARK OFFICE
CERTIFICATE OF CORRECTION

Page 1 of 1

| | |
|---|---|
| PATENT NO. | : 7,014,215 B2 |
| APPLICATION NO. | : 10/094171 |
| DATED | : March 21, 2006 |
| INVENTOR(S) | : Adrian R. Cooper, Geoffrey R. Keast and Randall M. Leasure |

It is certified that error appears in the above-identified patent and that said Letters Patent is hereby corrected as shown below:

Column 3, line 25, replace the word "alternated" with the word --alternate--.

Column 3, line 66, replace the word "ad" with the word --and--.

Column 4, lines 49 and 50, after the word "hose," replace the parenthetical phrase "(not depicted)" with the number --45--.

Column 4, lines 52-53, after the word "ferrule," replace the parenthetical phrase "(not depicted)" with the number --15--.

Column 7, lines 18 and 19, replace the sentence beginning "In the depressions reside..." with: --In the depressions reside first O-ring seal 26 with O-ring spacer 27, locking ring 32, and second O-ring seal 46, respectively.--.

Signed and Sealed this
Eleventh Day of October, 2011

David J. Kappos
*Director of the United States Patent and Trademark Office*